(12) United States Patent
Stephenson et al.

(10) Patent No.: US 7,237,192 B1
(45) Date of Patent: Jun. 26, 2007

(54) METHODS AND SYSTEMS FOR NAMING AND INDEXING CHILDREN IN A HIERARCHICAL NODAL STRUCTURE

(75) Inventors: Jeffrey Stephenson, Walnut Creek, CA (US); Adam Winer, San Mateo, CA (US); Blake Sullivan, Redwood City, CA (US); Brian Albers, San Jose, CA (US); Arjuna Wejeyekoon, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 10/136,698

(22) Filed: Apr. 30, 2002

(51) Int. Cl.
*G06N 3/00* (2006.01)
(52) U.S. Cl. .................................................. 715/513
(58) Field of Classification Search ................ 715/513, 715/517, 523, 530
See application file for complete search history.

(56) References Cited

U.S. PATENT DOCUMENTS

| | | | |
|---|---|---|---|
| 5,708,806 A | 1/1998 | DeRose et al. | |
| 5,970,496 A | 10/1999 | Katzenberger | |
| 6,061,697 A | 5/2000 | Nakao | |
| 6,427,123 B1 | 7/2002 | Sedlar | |
| 6,654,734 B1 * | 11/2003 | Mani et al. | 707/2 |
| 6,981,218 B1 | 12/2005 | Nagao | |
| 6,990,632 B2 | 1/2006 | Rothchiller et al. | |
| 7,024,622 B1 | 4/2006 | Young | |
| 7,124,358 B2 | 10/2006 | Carpenter | |
| 2002/0087596 A1 * | 7/2002 | Lewontin | 707/513 |
| 2002/0147748 A1 * | 10/2002 | Huang et al. | 707/517 |
| 2003/0221162 A1 * | 11/2003 | Sridhar | 715/501.1 |

OTHER PUBLICATIONS

Brown et al., "XML Schema: Formal Description," Sep. 25, 2001, <http://www.w3.org/TR/xmlschema-formal/>, pp. 1-74.*
DuCharme, "Finding Relatives," Oct. 4, 2000, <http://www.xml.com/lpt/a/2000/10/04/transforming/trxml5.html>, pp. 1-5.*
Hampton, "Perl XML Quickstart: The Standard XML Interfaces," May 16, 2001, <http://www.xml.com/lpt/a/2001/05/16/perlxml.html>, pp. 1-5.*

(Continued)

*Primary Examiner*—Stephen Hong
*Assistant Examiner*—Kyle Stork
(74) *Attorney, Agent, or Firm*—Young Law Firm, P.C.

(57) ABSTRACT

A hierarchically structured electronic document includes a parent node, a first and a second child of the parent node. The first child is configured as a named role child, the named role child having a first child component, the named role child specifying a relationship between the first child component and the parent node. The second child is configured as an index role child and has a plurality of second child components. The index role child specifies that all second child components are index children. The second child components collectively define and are configured to be rendered in the order in which the second child components appear under the second child. Collisions between named role and index children are avoided as the document includes a role (either a name role or an index role) between the parent and each child of the parent that is at the same hierarchical level.

19 Claims, 4 Drawing Sheets

OTHER PUBLICATIONS

Ogbuji, "Validation XML with Schematron," Nov. 22, 2000, <http://www.xml.com/lpt/a/2000/11/22/schematron.html>, pp. 1-6.*

Ray et al., "Perl and XML," Apr. 1, 2002. O'Reilly & Associates, Inc., First Edition, pp. 16-18, 29-33, 118-119, 153-155.*

Singh et al., "RE: [xsl] getting the node position in source xml in a variable," Feb. 27, 2002, <http://www.xslt.com/html/xsl-list/2002-02/msg01283.html>, pp. 1-2.*

St. Laurent, "On Display: XML Web Pages with Mozilla," Mar. 29, 2000, <http://www.xml.com/lpt/a/2000/03/29/tutorial/index.html>, pp. 1-9.* van der Vlist, "Comparing XML Schema Languages," Dec. 12, 2001, <http://www.xml.com/lpt/a/2001/12/12/schemacompare.html>, pp. 1-15.*

—"SML Linking Technologies," Oct. 4, 2000, <http://www.xml.com/lpt/a/2000/10/04/linking/index.html>, pp. 1-15.*

Fallside, David, "XML Schema Part 0: Primer," May 2, 2001, <http://www.w3.org/TR/2001/REC-xmlschema-0-20010502/>, pp. 1-74.*

* cited by examiner

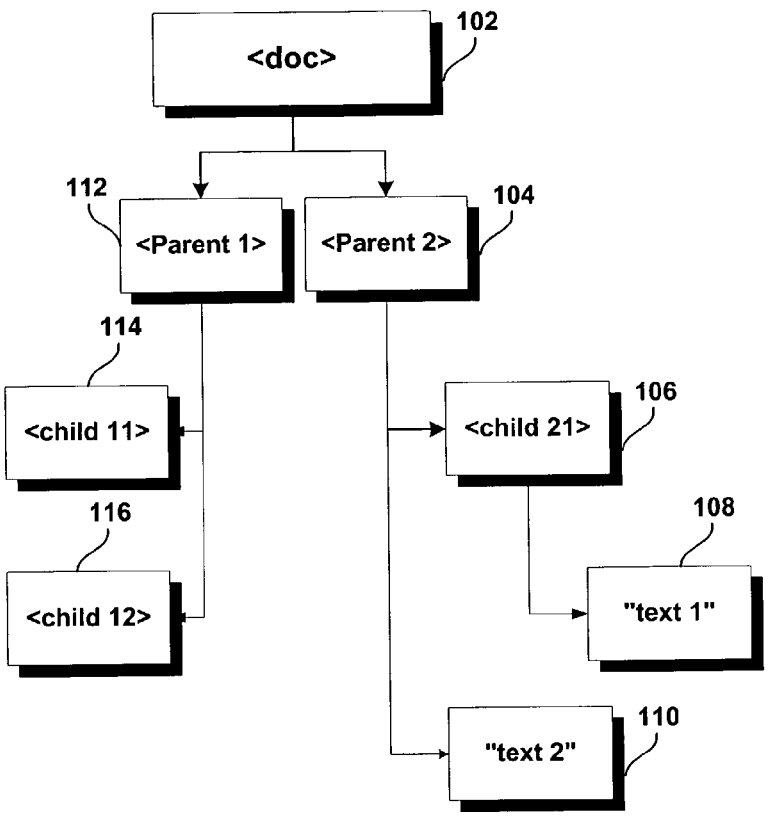
FIG. 1
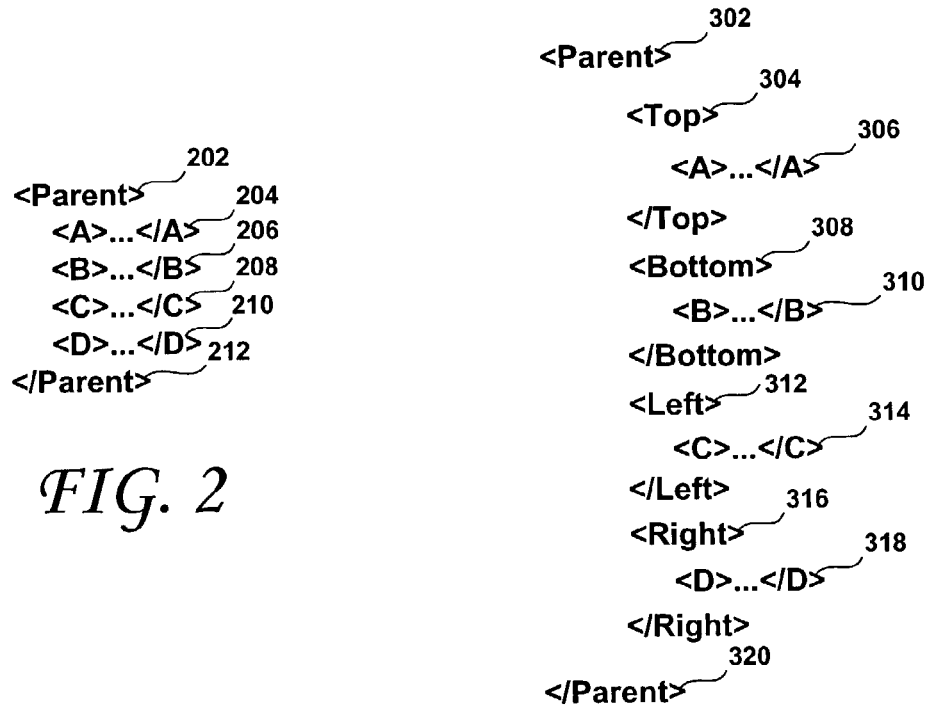
FIG. 2
FIG. 3

METHODS AND SYSTEMS FOR NAMING AND INDEXING CHILDREN IN A HIERARCHICAL NODAL STRUCTURE

BACKGROUND OF THE INVENTION

1. Field of the Invention

The present invention generally relates to methods and systems for providing documents structured as hierarchies of information. In particular, the present invention relates to methods and systems to avoid collisions between index role children and named role children in such structured documents.

2. Description of the Related Art

Extensible Markup Language (XML) is a standard for creating languages that meet the XML criteria. It is extensible, because data represented according to the XML standard may be marked up in any manner desired. For example, unlike Hyper Text Markup Language (HTML), the developer is free to add previously undefined tags to an XML document and an XML parser will be able to read the document. An XML document is a structured file. More particularly, XML documents are structured as hierarchies of information. That is, the elements (which must adhere to a limited set of rules) of an XML document may be thought as being organized in parent-child and sibling relationships (children that are at a same hierarchical level). FIG. 1 shows an example of such parent-child relationships. As shown, the hierarchy includes a root node 102 identified by the <doc> tag. The root node 102 has two children, namely Parent 1 112 and Parent 2 104. In turn, Parent 1 112 has two children: child 11 and child 12. Similarly, Parent 2 104 has a child 21 identified by the tag <child 21> and a text child "text2" 110. Continuing, <child 21> contains the text "text 1", as shown at 108. Such a hierarchical nodal relationship lends itself well to user interfaces (UI), for example, in which the nested relationship of the displayed windows, menus and the like are readily represented in such a hierarchical format.

The relationship of a child node with its parent may be characterized by means of a named role. Named children are associated with a specific role such as, for example, the placement of an element of a document on a Web page. Children may also be organized as indexed children, Indexed children have an inherent order, and the order of the indexed elements defines this inherent order.

FIG. 2 shows an example of a structured file illustrating an indexed relationship of the children of a parent node. The root node parent is bounded by a start tag <parent> 202 and an end tag </parent> 212. The parent node 202 may be said to contain the child nodes A, B, C and D, as shown at 204, 206, 208 and 210, respectively. A, B, C and D may be characterized as index children, and the order in which the children are listed defines the order of the index: first node A, then node B, followed by node C and lastly node D.

FIG. 3 shows another example of a structured file or document, illustrating named role children. The document of FIG. 3 includes a root node having a start tag <Parent> as shown at 302 and an end tag </Parent> referenced at 320. The Parent node 302 includes four named role children; namely Top 304, Bottom 308, Left 312 and Right 316. The named role children Top, Bottom, Left and Right 304, 308, 312 qualify the parent-child relationship; that is, they specify how the children are used by the parent. The roles may be specified within a Schema; that is, a model document that defines the structure of, for example, an XML document. XML Schemas, for example, are defined at www.w3.org.

In this case, the named role children Top, Bottom, Left and Right specify the placement of their respective children components A, B, C and D within the parent 302 and have no presence on the user interface but merely serve as positional indicators. To achieve the same functionality (i.e., specifying the placement of the components A, B, C and D within the structured document) using only indexed children requires respecting an arbitrary convention that specifies that, for example, the first indexed child A is to be rendered on top of the document, the second indexed child B is to be rendered on the bottom, the third indexed child C is to be rendered is to be rendered on the left and the fourth indexed child D is to be rendered on the right. This is because the order of the index children does not inherently imply their position or order on a user interface representation or within the structured hierarchical document. Such conventions are not flexible or practical. Moreover, it also not practical to insert a named role tag between each parent and each of its children. For instance, there are occasions where an indexed relationship (as shown in FIG. 2) is better suited to define the parent-child relationship and the relationship between children than is a named role relationship. For example, when the number of children becomes large, it becomes impractical to insert a role tag between each child and its parent. In other words, is unworkable to define a role for an arbitrary and unbounded indexed relationship. There are occasions, however, when a same parent requires (or would benefit from inclusion of) both indexed and named role children. For example, a Web page may include several predefined portions in which it is desired to put advertisements. Such predefined portions may readily be defined as named role children. The central portion of the page, however, may be reserved for content that changes from page to page. Indexed children may then be the most efficient manner of representing such content. Therefore, some manner of enabling both indexed and role children to co-exist under the same element is needed. However, merely placing indexed children directly under its parent (without a role tag between them) is not optimal, as collisions may occur between the tags of index children and that of the pre-defined named roles. Indeed, as the page is parsed and validated, each child may be examined to determine if its tag is listed as one of the predefined role tags. If the tag is listed, the child is a role child and if the tag is not listed, it is an indexed child. There could be instances, however, in which the tag for an intended index component is also listed among the predefined role tags. A collision of the names of the component and the roles occurs and the representation thereof in the UI is often unpredictable.

FIG. 4, which is a diagram of a conventional hierarchically structured document, illustrating just such a collision between a named role child and indexed components. As shown therein, the parent node is bounded by a start tag at 402 and an end tag at 424. The end tags of the children are not shown in FIG. 4, for clarity of illustration purposes only. The parent has a number of children, whose relationship therewith is specified by named roles 404, 412 and 416. Indeed, component A 406 may be rendered on top of the document, as the role child 404, in this illustrative example, specifies that the component A is to be rendered at a predetermined position at the top of the document. Likewise, the components C 414 and D 418 may be rendered to the left and right, respectively, of the document. These positional relationships are defined by the named roles, such as shown at 412 and 416. Components 408 and 410 are not preceded by a recognized named role and are, therefore, considered to be indexed children, and are to be rendered in the order in which they appear. Likewise, component 420 may be intended as the component child of a named role child, or may be intended as the first component of a set of index children 420, 422. However, there is an ambiguity here, as the tag of the child 420 is identical to that of a predefined named role, such as shown at 416. Therefore, a collision occurs and the document may not render as intended. The tag <Right2> 422, in this example, has no counterpart in the definition and list of the named roles and may be correctly interpreted as an index child.

What are needed, therefore, are methods and mechanisms to enable role children and index children to co-exist under a same parent without running the risk of collisions between the names assigned to index components and the names assigned to the predefined role children. What are also needed are methods and mechanisms to achieve this functionality in XML and/or other markup languages or standards.

SUMMARY OF THE INVENTION

It is, therefore, an object of the present invention to provide methods and systems for providing structured hierarchical documents as well as methods and systems for providing such structured documents.

In accordance with the above-described objects and those that will be mentioned and will become apparent below, a hierarchically structured electronic document, according to an embodiment of the present invention, includes a parent node, a first child of the parent node, the first child being configured as a named role child, the named role child having a first child component, the named role child specifying a relationship between the first child component and the parent node, and a second child of the parent node, the second child being configured as an index role child, the second child having a plurality of second child components, the index role child specifying that all second child components are index children, wherein the second child components collectively define an indexed order in which the second child components appear hierarchically under the second child and wherein the second child components are configured to be rendered in the indexed order.

The relationship between the first child component and the parent node may define a position (among other possible relationships, for example) of the first child component within the electronic document when the electronic document is rendered. The first child and the second child may each be defined by a tag in a markup language or standard, such as XML or one of its variants, for example. The document may include one or more components between each first or second child of the parent node and a next first or second child of the parent node. The document may include a role between the parent and each child of the parent that is at the same hierarchical level.

The present invention is also a method of creating a hierarchically structured electronic document, the document including a parent node and a plurality of hierarchically lower child nodes, comprising the steps of providing a parent node; providing a first child of the parent node, the first child being configured as a named role child, the named role child having a first child component, the named role child specifying a relationship between the first child component and the parent node; providing a second child of the parent node, the second child being configured as an index role, the second child having a plurality of second child components, the index role specifying that all second child components are index children, wherein the second child components collectively define an indexed order in which the second child components appear hierarchically under the second child and wherein the second child components are configured to be rendered in the indexed order, and defining at least one named role and an index role and storing the at least one named role and the index role in a document model against which the hierarchically structured electronic document may be validated.

The relationship may include a position of the first child component within the electronic document when the electronic document is rendered. The first child and the second child may each be defined by a tag in a markup language, such as XML or one of its variants, for example. The model document may be a Document Type Definition (DTD) syntax or an XML Schema, for example. The document may include one or more components between each first or second child of the parent node and a next first or second child of the parent node. The document may include a role between the parent and each child of the parent that is at the same hierarchical level.

According to another embodiment thereof, the present invention is a computer system configured for providing a hierarchically structured electronic document, comprising at least one processor; at least one data storage device; a plurality of processes spawned by said at least one processor, the processes including processing logic for: providing a parent node; providing a first child of the parent node, the first child being configured as a named role child, the named role child having a first child component, the named role child specifying a relationship between the first child component and the parent node; providing a second child of the parent node, the second child being configured as an index role, the second child having a plurality of second child components, the index role specifying that all second child components are index children, wherein the second child components collectively define an indexed order in which the second child components appear hierarchically under the second child and wherein the second child components are configured to be rendered in the indexed order, and defining at least one named role and an index role and storing the at least one named role and the index role in a document model against which the hierarchically structured electronic document may be validated.

The relationship may include a position of the first child component within the electronic document when the electronic document is rendered. The first child and the second child may each be defined by a tag in a markup language, such as XML or one of its variants, for example. The model document may be a Document Type Definition (DTD) syntax or an XML Schema, for example. The document may include at least one component between each first or second child of the parent node and a next first or second child of the parent node.

According to still another embodiment thereof, the present invention is also a machine-readable medium having data stored thereon representing sequences of instructions which, when executed by computing device, causes said computing device to providing a hierarchically structured electronic document, by performing the steps of providing a parent node; providing a first child of the parent node, the first child being configured as a named role child, the named role child having a first child component, the named role child specifying a relationship between the first child component and the parent node; providing a second child of the parent node, the second child being configured as an index role, the second child having a plurality of second child components, the index role specifying that all second child components are index children, wherein the second child components collectively define an indexed order in which the second child components appear hierarchically under the second child and wherein the second child components are configured to be rendered in the indexed order, and defining at least one named role and an index role and storing the at least one named role and the index role in a document model against which the hierarchically structured electronic document may be validated.

The relationship may include a position of the first child component within the electronic document when the electronic document is rendered. The first child and the second child may each be defined by a tag in a markup language, such as XML or one of its variants, for example. The model document may be a Document Type Definition (DTD) syntax and an XML Schema, for example. The document may include at least one component between each first or second child of the parent node and a next first or second child of the parent node.

BRIEF DESCRIPTION OF THE DRAWINGS

For a further understanding of the objects and advantages of the present invention, reference should be had to the following detailed description, taken in conjunction with the accompanying figures, wherein:

FIG. 1 is a diagram of a conventional hierarchical structured document.

FIG. 2 is a diagram illustrating a conventional use of indexed components in a hierarchically structured document.

FIG. 3 is a diagram illustrating a conventional use of role children to characterize the relationship between a parent and a child in a structured document.

DESCRIPTION OF THE INVENTION

Functional Description

Figure 4:
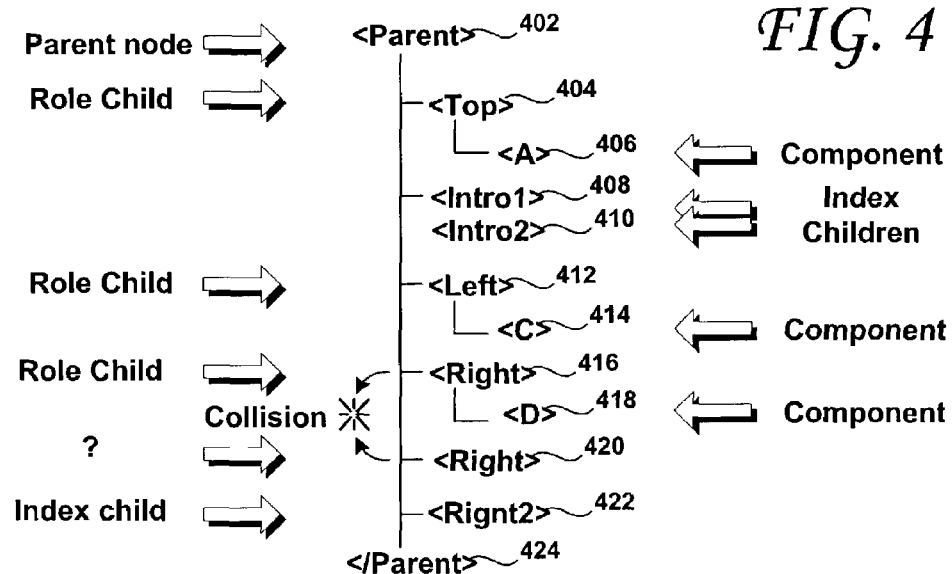
FIG. 4 is a diagram of a conventional hierarchically structured document, illustrating a collision between a named role child and indexed components.
Figure 5:
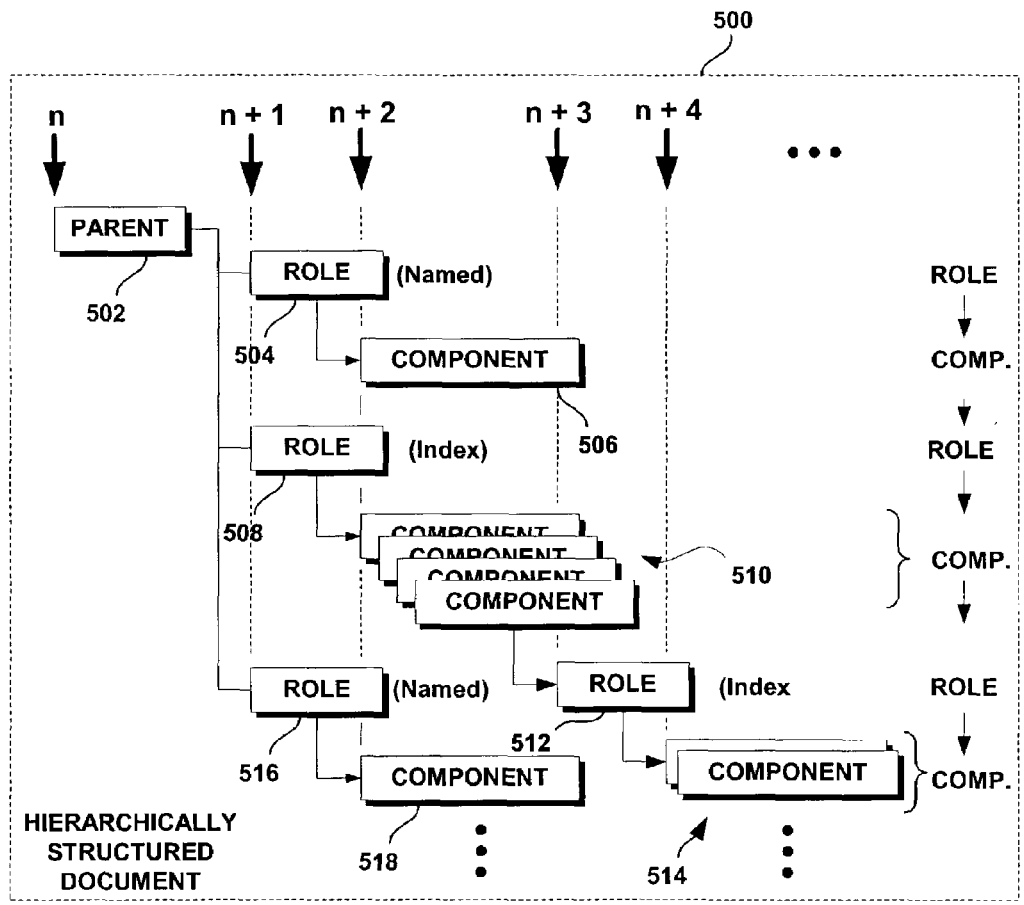
FIG. 5 is a diagram of a hierarchically structured document, according to an embodiment of the present invention.

FIG. 5 is a diagram of a hierarchically structured document 500, according to an embodiment of the present invention. As shown therein, the document 500 is configured as a hierarchy, in that a parent 502 has a plurality of hierarchically lower child nodes 504, 508, 516. If the parent 502 is arbitrarily assigned to hierarchical level n, the children 504, 508 and 516 may be said to occupy hierarchical level n+1. In turn, each of the children 504, 508 and 516 may themselves have children, at level n+2. The children at level n+2 include components; that is, elements of the structured document 500 that have a visible presence in the document, however rendered or provided. As shown, child 504 may have a component child 506, child 508 may have a plurality of component children collectively referenced at 510 and child 516 may have a component child 518. Similarly, any of the component children may itself have hierarchically lower children, such as shown at 512, at the n+3 level in the hierarchy. In turn, such children may themselves have component children, as collectively shown at reference numeral 514. The document 500 may have an arbitrary level of complexity. However, for simplicity's sake, the structured document shown in FIG. 5 is limited to four hierarchy levels, as shown.

According to the present invention, the hierarchically structured document 500 is organized as a succession of pairs, each pair including a role child and at least one component. As shown, the relationship of each child to its parent is specified by a role. The role, as detailed below, may be named and defined in a list of allowable roles that may be included in a Document Type Definition (DTD) syntax or within a model document such as an XML Schema, for example. For example, the child 504 may be a named role child that is named and defined in a DTD syntax or a Schema, for example. For example, the named role children may specify the placement of the component child thereof. For example, the named role child 504 may specify that the component child 506 is to be placed within a predetermined header portion of the document, whereas the named role child 516 may specify that the component child 518 thereof be placed within an advertising banner section of the document, for example. Therefore, the named role children may specify, for example, the positional placement of the components within the document. Named role children may be utilized to specify other characteristics or functions within the context of the present invention. The role children, according to the present invention, are not limited to named role children. Indeed, the role children according to the present invention may either be named role children or index role children. An index role is a novel type of role that specifies that the child or children to which it refers are in an indexed relationship relative to one another. According to the present invention, the order in which a named role child appears under its parent is unimportant. Therefore, the order of the index role child determines its placement. The role child 508 shown in FIG. 5 is such an index role child. In this manner, the document 500 includes a role (either characterized as a named role or an index role) between the parent and each child of the parent that is at a same hierarchical level. By combining named role children and index role children, collisions are entirely avoided. That is, it is no longer possible for a named role child to be mischaracterized as an index role child, and vice-versa. Indeed, even if named role child 504 is called "Header" (is identified by a <Header> tag, for example) and a component 510 is also called "Header" (is also identified by the <Header> tag), the identically tagged child 504 and component 510 are always distinguishable, as all components 510 are children of an index role child 508, which specifies that all children thereof are in an indexed relationship (1st, 2nd, 3rd, etc.) relative to one another, whereas the role child 504 refers to one of a predetermined list of named roles (stored in a DTD, Schema or other model document that defines the allowable vocabulary for the document), for example. As the hierarchy of the structured document 500 is traversed, each child within a same hierarchy level is associated with a role, whether a named role or an index role. In this manner, the children of the parent node 502, according to an embodiment of the present invention, may be organized as a succession of role-component pairs, making collisions impossible as long as this convention is observed and maintained. Stated differently, according to the present invention, the structured document 500 includes a descriptive role between each parent and its child or children. That descriptive role may be a named role or an index role. According to an embodiment of the present invention, the index role child may be represented by a tag having a predetermined name, which predetermined name indicates that all children thereof are index children; that is, an ordered list of children. For example, the index role children 508 and 512 may be represented by a tag named "Contents", which Contents tag indicates that the components 510 and 514 are respective sets of index components of children 508 and 514. Those of skill in this art will readily recognize that most any name may be used to designate the role tag indicating indexed children, the present invention not being limited to the arbitrary nomenclature "Contents" for the role tag indicating an index role child.

The definition of the contents role (and that of any other role) may be defined in a DTD, with which an XML document may be validated by means of a validating parser. Alternatively, a non-validating parser may be used. However, when a non-validating parser is used, content validating code must then be included in the application making use of the present XML document. In practice, the roles (both named and indexing), according to an embodiment of the present invention, may be defined in a DTD (for example). A parser may then read the DTD and store the parser definitions in memory. Thereafter, as the parser reads the present structured document, it may validate each role it encounters against a matching role (either named or index) definition stored in memory (and generate an error when no such match is found). The DTD may be embedded into an XML document according to the present invention. If a non-validating parser is used, the embedded DTD may simply be ignored.

Alternatively, the definition of the contents role designating an indexed relationship (and that of any other role, such as a named role) may be defined in a Schema or other model. The present structured document may, according to the present invention, contain a reference to the Schema that defines its vocabulary; that is, a list of valid document elements. The definition of the Contents role disclosed herein may be stored in a Schema and the present structured document may be validated by a parser against such a Schema. When the present structured document is an XML document, the validated XML document becomes an XML Schema instance document. Other methods and means of defining and storing the named and index roles according to the present invention may occur to those of skill in this art and all such other methods and means are deemed to fall within the scope of the present invention.

Figure 6:
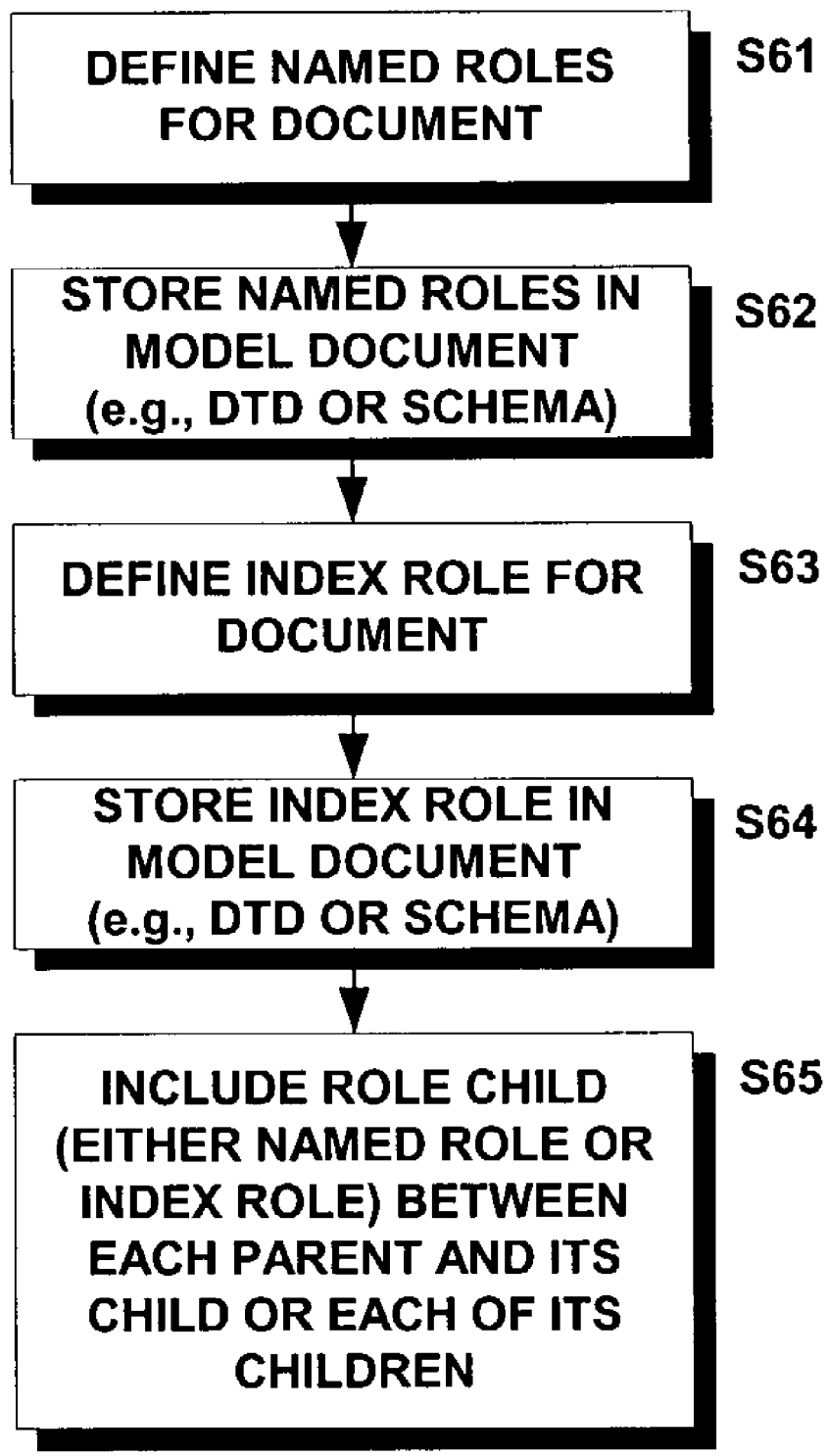
FIG. 6 is a flowchart of an embodiment of the present method for generating a structured document.

FIG. 6 is a flowchart of an embodiment of the present method for generating or providing a structured document. As shown therein, step S61 calls for defining named roles for the structured document to be generated or provided. Step S62 calls for storing the defined named roles in a model document, such as a DTD or an XML Schema, for example. Thereafter, an index role may be defined (step S63) and stored in the model document (step S64). It is to be noted that steps S63 and S64 may be carried out before steps S61 and S62. Alternatively, steps S62 and S63 may be combined. Also, the definition of the roles may be embedded in the present structured document itself, making it, in effect, self-defining and self-describing. When generating the present structured document, a role child (whether named or index) is included between each parent and its child or children (such as a component that has a presence on the document, UI or other perceptible manifestation of the document). In this manner, the present document may be structured as a sequence of role and component pairs, whereby the relationship of each component to its parent is specified as either a predefined named role or an index role, which avoids collisions between identically named index component children and named role children.

Hardware Description

Figure 7:
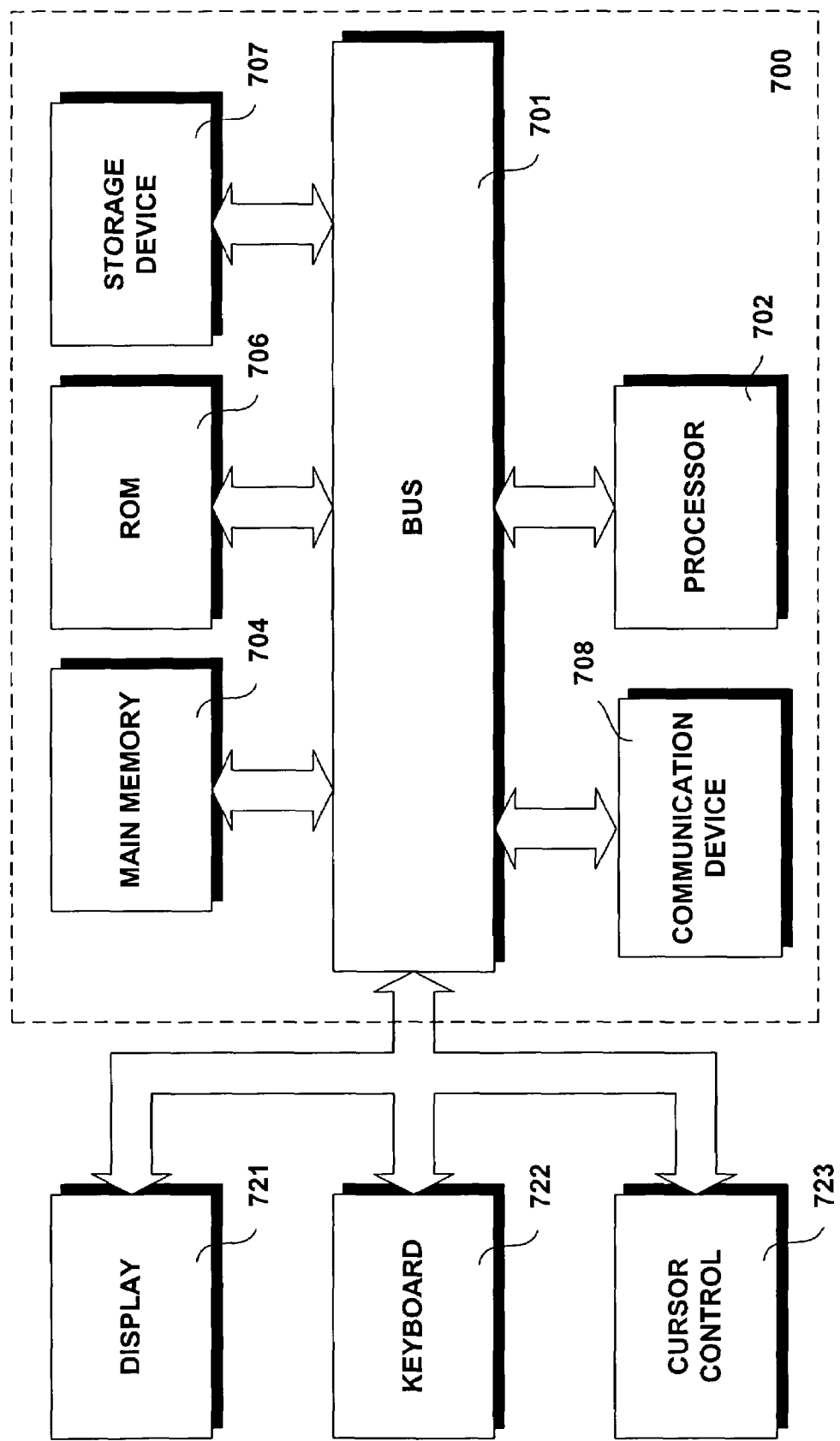
FIG. 7 is a block diagram of a computer with which the present invention may be practiced.

FIG. 7 illustrates a block diagram of a computing device 700 with which an embodiment of the present invention may be implemented. Computing device 700 (such as server 204, for example) includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 401 to provide access to a network, such as shown at 102 in FIG. 1.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device might be the user's own voice or cursor control 723, such as a mouse, a trackball, or cursor direction keys for communicating direction information and command selections to processor 702 and for controlling cursor movement on display 721.

The present invention is related to the use of computing device 700 configured to create and render structured documents according to the present invention, as disclosed above. According to one embodiment, the processing may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computing device including a processor for rendering a hierarchically structured electronic document, comprising:
   means for rendering a parent node,
   means for rendering a first child of the parent node, the first child being configured as a named role child by a first tag, the named role child having a first child component, the first tag specifying a positional placement of the first child component within the electronic document, and
   means for rendering a second child of the parent node, the second child being configured as an index role child by a second tag that is different from the first tag, the second child having a plurality of second child components, each second child component being at a same hierarchical level as every other one of the plurality of second child components of the second child, the second tag specifying that all second child components are index children, wherein the second child components are in a specified index relationship with one another to collectively define an indexed order in which the second child components appear hierarchically under the second child such that the second child components are rendered in the hierarchically structured electronic document in the indexed order irrespective of an intended positional placement of any one of the second child components in the hierarchically structured document, each child of the parent node at the same hierarchical level within the electronic document being configured either as a name role child or an index role child.

2. The computing device for rendering the hierarchically structured electronic document of claim 1, wherein the first tag and the second tag are each defined in a markup language or standard.

3. The computing device for rendering the hierarchically structured electronic document of claim 2, wherein the markup language or standard is XML.

4. The computing device for rendering the hierarchically structured electronic document of claim 1, wherein the document includes at least one component between each first or second child of the parent node and a next first or second child of the parent node.

5. A method of creating a hierarchically structured electronic document, the document including a parent node and a plurality of hierarchically lower child nodes, comprising the steps of:
   providing a parent node;
   providing a first child of the parent node, the first child being configured as a named role child by a first tag, the named role child having a first child component, the first tag specifying a positional placement of the first child component within the electronic document;
   providing a second child of the parent node, the second child being configured as an index role by a second tag that is different from the first tag, the second child having a plurality of second child components, each second child component being at a same hierarchical level as every other one of the plurality of second child components of the second child, second tag specifying that all second child components are index children, wherein the second child components are in a specified index relationship with one another to collectively define an indexed order in which the second child components appear hierarchically under the second child such that the second child components are rendered in the hierarchically structured electronic document in the indexed order irrespective of an intended positional placement of any one of the second child components in the hierarchically structured document, each child of the parent node at the same hierarchical level within the electronic document being configured either as a name role child or an index role child, and
   defining at least one named role and an index role and storing the at least one named role and the index role in a document model against which the hierarchically structured electronic document may be validated.

6. The method of creating a hierarchically structured electronic document of claim 5, wherein the first tag and the second tag are each defined in a markup language or standard.

7. The method of creating a hierarchically structured electronic document of claim 6, wherein the markup language is XML.

8. The method of creating a hierarchically structured electronic document of claim 7, wherein the model document is selected from the group including a Document Type Definition (DTD) syntax and an XML Schema.

9. The method of creating a hierarchically structured electronic document of claim 5, wherein the document includes at least one component between each first or second child of the parent node and a next first or second child of the parent node.

10. A computer system configured for providing a hierarchically structured electronic document, comprising:
    at least one processor;
    at least one data storage device;
    a plurality of processes spawned by said at least one processor, the processes including processing logic for:
    providing a parent node;
    providing a first child of the parent node, the first child being configured as a named role child by a first tag, the named role child having a first child component, the first tag specifying a positional placement of the first child component within the electronic document;
    providing a second child of the parent node, the second child being configured as an index role by a second tag that is different from the first tag, the second child having a plurality of second child components, each second child component being at a same hierarchical level as every other one of the plurality of second child components of the second child, second tag specifying that all second child components are index children, wherein the second child components are in a specified index relationship with one another to collectively define an indexed order in which the second child components appear hierarchically under the second child such that the second child components are rendered in the hierarchically structured electronic document in the indexed order irrespective of an intended positional placement of any one of the second child components in the hierarchically structured document, each child of the parent node at the same hierarchical level within the electronic document being configured either as a name role child or an index role child, and
    defining at least one named role and an index role and storing the at least one named role and the index role in a document model against which the hierarchically structured electronic document may be validated.

11. The computer system of claim 10, wherein the first child and the second child are each defined by a tag in a markup language.

12. The computer system of claim 11, wherein the markup language is XML.

13. The computer system of claim 12, wherein the model document is selected from the group including a Document Type Definition (DTD) syntax and an XML Schema.

14. The computer system of claim 10, wherein the document includes at least one component between each first or second child of the parent node and a next first or second child of the parent node.

15. A machine-readable medium having data stored thereon representing sequences of instructions which, when executed by computing device, causes said computing device to providing a hierarchically structured electronic document, by performing the steps of:
 providing a parent node;
 providing a first child of the parent node, the first child being configured as a named role child by a first tag, the named role child having a first child component, the first tag specifying a positional placement of the first child component within the electronic document;
 providing a second child of the parent node, the second child being configured as an index role by a second tag that is different from the first tag, the second child having a plurality of second child components, each second child component being at a same hierarchical level as every other one of the plurality of second child components of the second child, second tag specifying that all second child components are index children, wherein the second child components are in a specified index relationship with one another to collectively define an indexed order in which the second child components appear hierarchically under the second child such that the second child components are rendered in the hierarchically structured electronic document in the indexed order irrespective of an intended positional placement of any one of the second child components in the hierarchically structured document, each child of the parent node at the same hierarchical level within the electronic document being configured either as a name role child or an index role child, and
 defining at least one named role and an index role and storing the at least one named role and the index role in a document model against which the hierarchically structured electronic document may be validated.

16. The machine readable medium of claim 15, wherein the first child and the second child are each defined by a tag in a markup language.

17. The machine-readable medium of claim 16, wherein the markup language is XML.

18. The machine-readable medium of claim 17, wherein the model document is selected from the group including a Document Type Definition (DTD) syntax and an XML Schema.

19. The machine readable medium of claim 15, wherein the document includes at least one component between each first or second child of the parent node and a next first or second child of the parent node.

* * * * *

UNITED STATES PATENT AND TRADEMARK OFFICE
CERTIFICATE OF CORRECTION

| | | |
|---|---|---|
| PATENT NO. | : 7,237,192 B1 | Page 1 of 1 |
| APPLICATION NO. | : 10/136698 | |
| DATED | : June 26, 2007 | |
| INVENTOR(S) | : Stephenson et al. | |

It is certified that error appears in the above-identified patent and that said Letters Patent is hereby corrected as shown below:

Title Page, item (75), line 1, after "Stephenson," replace "Walnut Creek" with -- San Carlos --.

Title Page, item (75), line 5, after "Arjuna" replace "Wejeyekoon" with -- Wijeyekoon --.

Column 11, line 11, replace "providing" with -- provide --.

Signed and Sealed this

Eleventh Day of September, 2007

JON W. DUDAS
*Director of the United States Patent and Trademark Office*